United States Patent [19]
Ennamorato et al.

[11] Patent Number: 6,058,117
[45] Date of Patent: May 2, 2000

[54] DATA TRANSFER VIA PSEUDO DETERMINISTIC CHANNEL

[75] Inventors: Mark Ennamorato, Raleigh; David A. Larson, Cary, both of N.C.; Carl R. Gyllenhammer, Cupertino, Calif.; Scott Brasington, Cary, N.C.

[73] Assignee: Cisco Technology, Inc., San Jose, Calif.

[21] Appl. No.: 08/958,697

[22] Filed: Oct. 27, 1997

[51] Int. Cl.[7] .................................................. H04L 12/47
[52] U.S. Cl. ........................... 370/442; 370/463; 709/250
[58] Field of Search ..................................... 370/357, 359, 370/360, 362, 364, 366, 294, 331, 442, 463; 375/371, 372, 373; 709/250

[56] References Cited

U.S. PATENT DOCUMENTS

| | | | |
|---|---|---|---|
| 4,703,486 | 10/1987 | Bemis | 370/252 |
| 4,827,411 | 5/1989 | Arrowood et al. | 364/300 |
| 4,965,772 | 10/1990 | Daniel et al. | 364/900 |
| 5,353,313 | 10/1994 | Honea | 375/118 |
| 5,438,614 | 8/1995 | Rozman et al. | 379/93 |
| 5,442,315 | 8/1995 | Hutchins | 327/159 |
| 5,555,244 | 9/1996 | Gupta et al. | 370/60.1 |
| 5,579,321 | 11/1996 | Van Grinsven et al. | 370/442 |
| 5,673,265 | 9/1997 | Gupta et al. | 370/432 |
| 5,719,867 | 2/1998 | Borazjani | 370/442 |

*Primary Examiner*—Hassan Kizou
*Assistant Examiner*—Daniel Previl
*Attorney, Agent, or Firm*—Allston L. Jones

[57] ABSTRACT

A system to utilize a non-deterministic shared local bus to transport signals to and from TDM signal channels via processing devices that use a pseudo clock signal derived from local bus transfers to synchronize those data transfers with the highly accurate clock of the TDM bus.

17 Claims, 10 Drawing Sheets

Fig. 3b (Prior Art) — TDM Frame Format

Fig. 3c (Prior Art) — Channel Format

Fig. 3d (Prior Art) — Local Bus Format

DATA TRANSFER VIA PSEUDO DETERMINISTIC CHANNEL

FIELD OF THE INVENTION

The present invention relates to the bi-directional interfacing of a Time-Division Multiplexed (TDM) bus having multiple channels of data in a highly deterministic data stream, such as occurs on a T1/E1 line provided by the Public Switched Telephone Network (PSTN), to a digital non-deterministic data stream on a local data bus (e.g., a PCI bus).

BACKGROUND OF THE INVENTION

A TDM interface is a highly synchronous system that is used to bi-directionally transport a number of different independent data channels. For example, a T1 line contains a TDM serial data stream formatted in frames each containing data for 24 channels. For a T1 line, within each 125 μsec. TDM frame, each of the 24 sub-frames contains 8 bits of data for the corresponding channel thus defining a data rate per channel on the T1 line of 64 Kbits/sec. Any prior art device that processes one of those TDM channels must remain synchronized to the T1 reference clock to avoid any data loss from 'frame slips' in either the upstream or the downstream direction. Thus, a TDM switch is generally used to receive/send the data from/to the data stream on the T1 line, to derive a clock signal from the highly accurate data rate on the T1 line, and to then distribute a clock signal synchronized to the clock rate of the T1 line and individual channels of data to various processing devices to terminate the data from each channel for delivery via a digital local bus to one or more host computers. Similarly, since this is a bidirectional system, the TDM switch formats data from the various processing devices into the expected TDM format for delivery upstream on the TDM bus. This interchange of upstream and downstream data is performed in a handshake manner i.e., a simultaneous transfer of one up-stream TDM frame for each downstream TDM frame.

The prior art provides the interface between a TDM serial data stream on a highly deterministic signal bus and a parallel local bus through manipulation of the signals in the TDM data stream. This requires the use of a highly accurate synchronous clock that matches the highly accurate rate of the signals in the TDM data stream and the use of cross-bar switches to direct each of the 24 channels of data to or from the TDM bus. This is necessary to keep all of the signals from the 24 TDM bus channels synchronized. Such prior art systems are very hardware intensive.

It would be advantageous to perform more functions in such a system that are today performed with dedicated hardware with microprocessors and software. If that were done, the amount of hardware needed for these systems would be reduced, and thus costs would be reduced. Additionally, the hardware that is needed is simplified since it is not embedded in the TDM bus structure with all of the accurate timing demands necessary to process the TDM signals. In addition, the user would only need to purchase a T1/E1 interface unless the application requires additional functionality. The various embodiments of the present invention provide such implementations.

SUMMARY OF THE INVENTION

The present invention utilizes a shared local bus to transport signals to and from TDM signal channels via processing devices that use a pseudo clock signal derived from the local bus transfers to synchronize the data transfers with the highly accurate clock of the TDM bus.

BRIEF DESCRIPTION OF THE FIGURES

FIG. 3b is a simplified signal diagram of a TDM data stream and related signals carried on a TDM bus.

FIG. 3c is a simplified signal diagram of the data bits in each channel of a TDM data stream.

FIG. 3d is a simplified signal diagram of data on a shared address local bus.

DETAILED DESCRIPTION OF THE PREFERRED EMBODIMENTS

Figure 1:
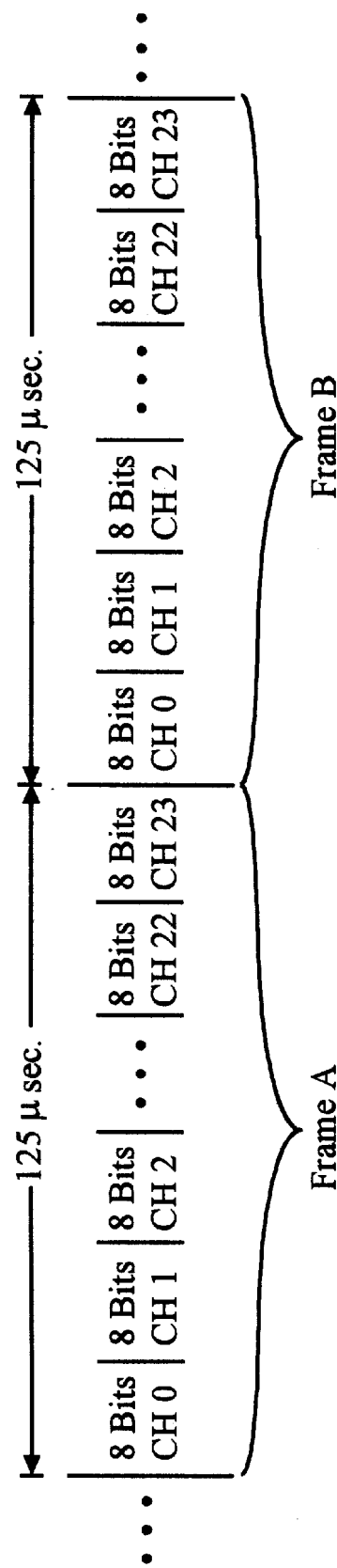
FIG. 1 is timing diagram that is representative of a TDM formatted signal of the prior art.

FIG. 1 is a simplified timing diagram that illustrates the format structure of a TDM signal. For purposes of illustration, the signal structure on a T1 telephone line is used for illustration herein. There are other applications for a TDM signal structure, and the present invention is applicable to all of them. From FIG. 1 it can be seen that the TDM signal on a T1 line is formatted into frames that are each 125 μsec. in length (e.g., Frame A and Frame B) with each frame divided equally into 24 sub-frames, each sub-frame containing 8 bits of data for a different channel 0–23. The 125 μsec. clock time for each frame is also established by a very accurate clock source. One application for such signals is the Public Switched Telephone Network (PSTN) with the physical line that carries such signals referred to as either a TDM bus, or a T1 line in North America or and E1 line in Europe.

Figure 2A:
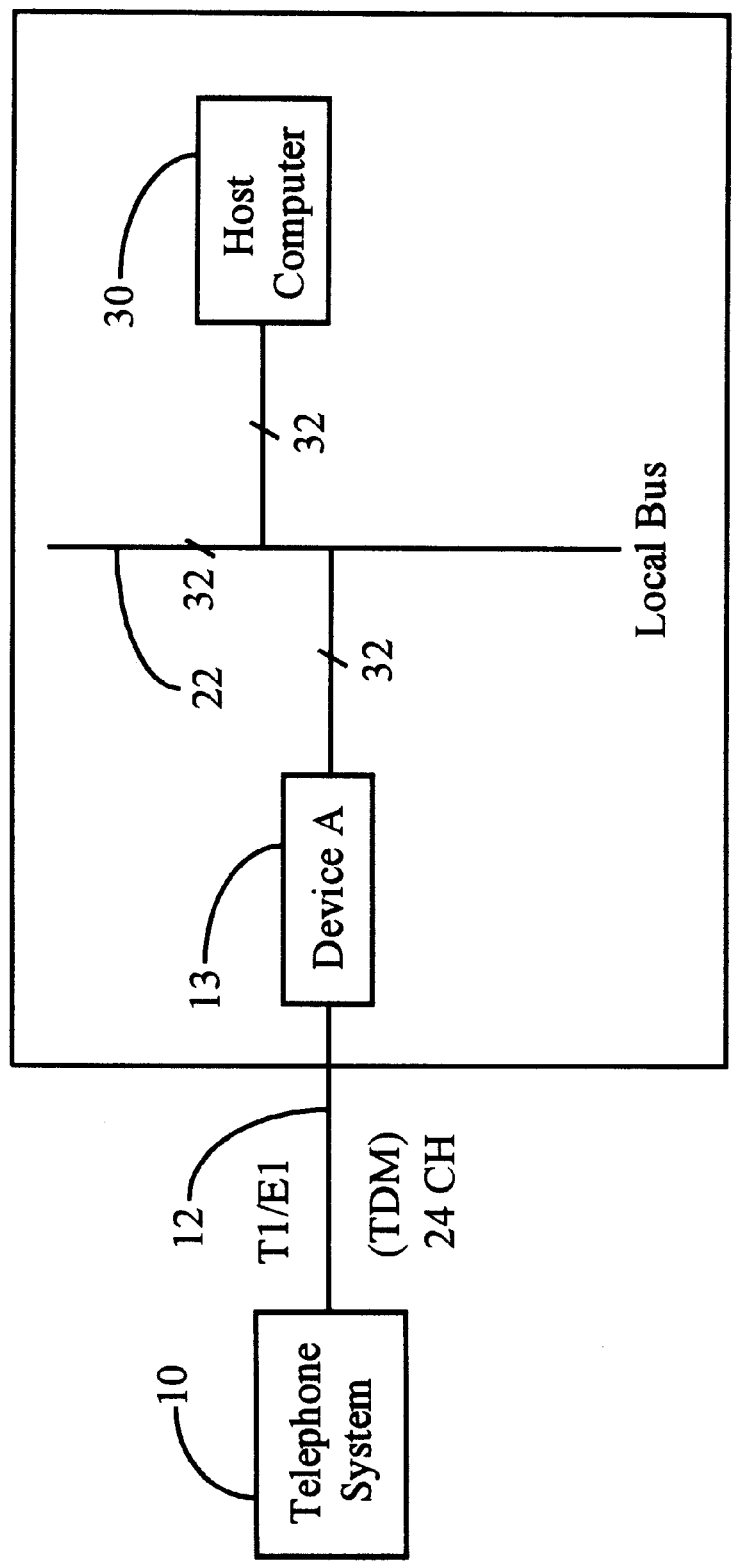
FIG. 2a is a schematic representation of the simplest prior art system for interfacing a TDM signal to a host computer via a local bus.

The prior art utilizes basically two different termination structures where it is desirable to bi-directionally exchange data between a TDM signal stream and a non-deterministic local bus to which a host computer interfaces. Again using the PSTN system as an example, FIG. 2a shows the simplest, and least flexible of the two prior art termination configurations. Here there is a bi-directional interface of a T1/E1 TDM data stream to a host computer 30 via a local bus 22 (e.g., PCI bus). The commercial telephone system 10 provides a bi-directional TDM bus 12 that carries 24 multiplexed channels of information to/from the telephone interface unit 14. For simplicity, the initial discussion of the prior art system will be discussed only in the downstream direction, however it should be understood that for each TDM data frame that is delivered downstream from TDM bus 12, a like TDM data frame must be delivered upstream to TDM bus 12 for delivery to telephone system 10.

Within telephone interface unit 14, in the simplest structure, there is a device 13 connected between TDM bus 12 and local bus 22, and host computer 30 is also connected to local bus 22. Device 13 is capable of terminating all 24 channels of data from the TDM data stream. This is possible when all 24 channels are to be terminated in the same manner (e.g., modulated/ demodulated). Thus device 13 at a minimum contains the necessary terminating hardware and a serial to parallel converter to handle the 32 bit wide samples that are typically used on local bus 22. This structure however can not be used when different types of signal terminations are required for various channels in the TDM data stream, or if host computer 30 expects to receive a particular signal on a channel that does not coincide with the channel in the TDM data stream that is carrying that signal.

Figure 2B:
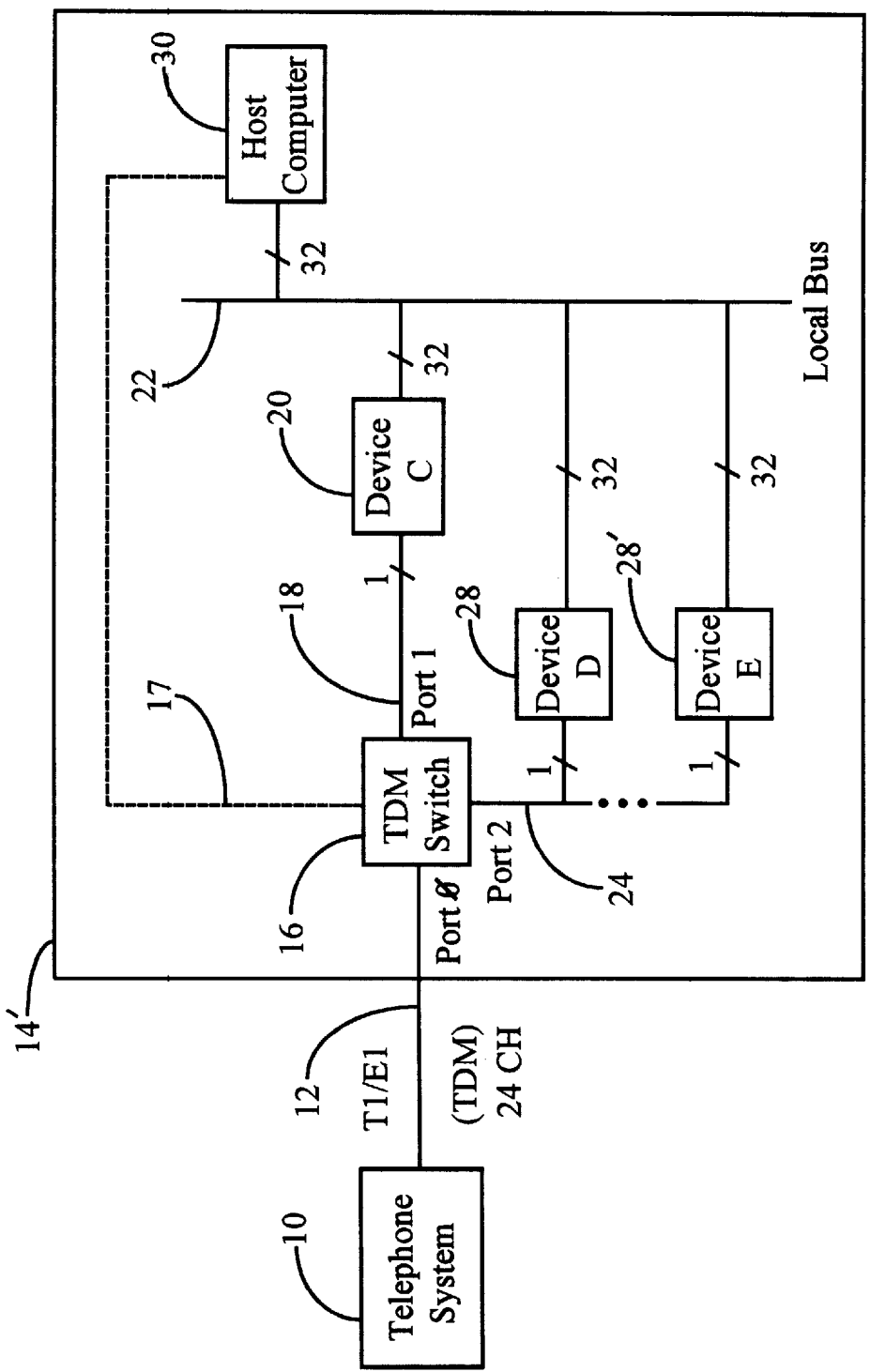
FIG. 2b is a schematic representation of a more general prior art system for interfacing a TDM signal to a host computer via a local bus.

Referring next to FIG. 2b there is shown a second configuration of the prior art that has the capability of performing numerous termination routines, as well as channel reassignment. As in FIG. 2a, a bi-directional interface of a T1/E1 TDM data stream is provided to a host computer system via a local bus. Here, as in FIG. 2a, the commercial telephone system 10 provides a bi-directional TDM bus 12 that caries 24 TDM channels of information to/from telephone interface unit 14'.

In this configuration, telephone interface unit 14' includes a TDM switch 16 with port 0 interfacing directly with TDM bus 12. The function of the TDM switch is multi-fold: multiplex/demultiplex the various channel signals of TDM bus 12; provide/receive single channel signals via various ports (e.g., port 1 or port 2) to/from various termination devices; to shift channel assignments for various data signals under the direction of host computer 30; etc. Such switches are available in multiple configurations from a simple TDM switch having 2 ports (e.g., port 0 and port 1) to perhaps as many as 8 ports. In each configuration, port 0 connects to TDM bus 12 and the additional ports interface with different devices within telephone interface unit 14' to terminate the various channel signals as necessary. Typically, port 0 receives master clock and TDM data stream from TDM bus 12. A TDM switch is typically implemented with cross-bar switches to enable the shifting of data in any channel of the TDM data stream at port 0 to the same or any other channel at any of the secondary ports of TDM switch 16, every port is a serial data interface.

In the example shown in FIG. 2b, TDM switch 16 has three ports: port 0 is interfaced to TDM bus 12, port 1 interfaces with device 20 (e.g., to terminate the HDLC overhead of several channels), and port 2 interfaces with a plurality of devices 28, 28' (only two are shown here however there can be more than two as indicated by the dotted line) to, for example, terminate modem modulated channel signals. Additionally, there is a configuration path between TDM switch 16 and host computer 30 to instruct TDM switch 16 as to which channel in the TDM data stream is to be switched in time to a different channel for processing by one of devices 20, 28 and 28" and for transmission on local bus 22, as well as to which port of TDM switch 16 that data is to be interfaced.

Figure 3A:
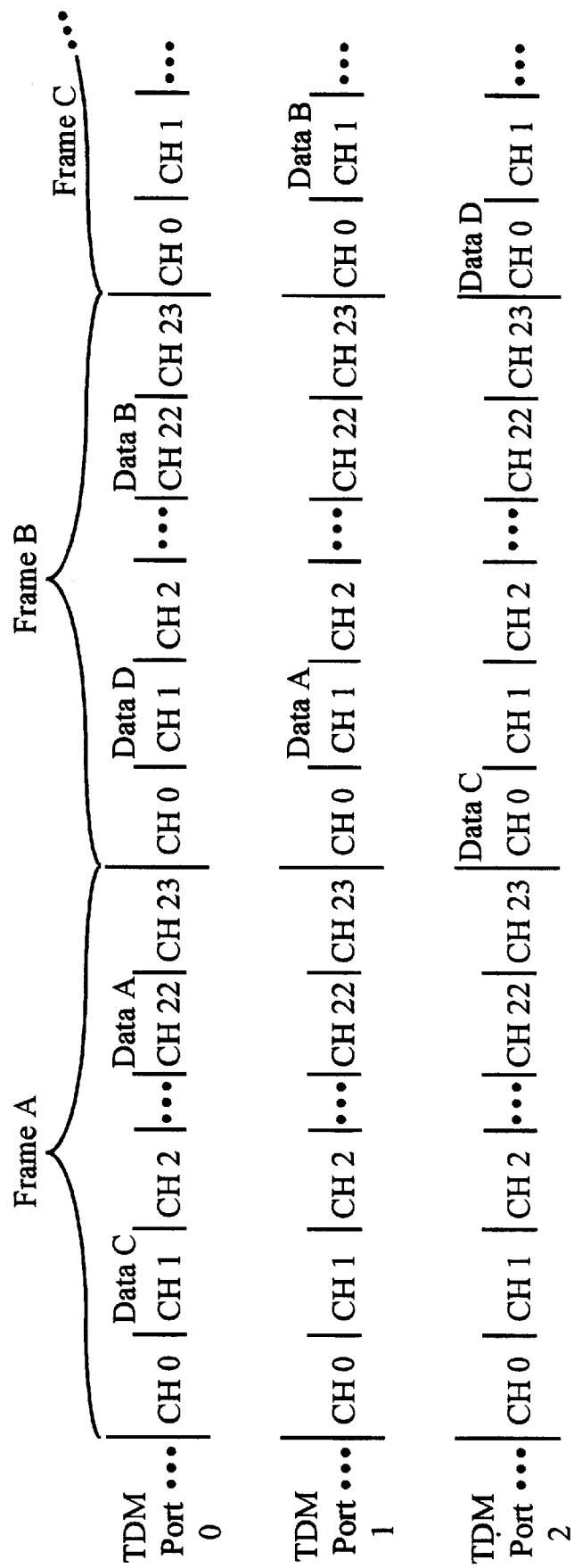
FIG. 3a is a timing diagram to illustrate the operation of a typical TDM switch of the prior art.

Referring also to FIG. 3a, for example, assume that device 20 is constructed so that it must receive data on channel 1 and that data in the TDM stream is in channel 22. Similarly, assume that device 28 is constructed so that it must receive data on channel 0 and that data in the TDM stream is in channel 1. Thus, since device 20 is connected to port 1, host 30 instructs TDM switch 16, via configuration interface 17 (this may also be carried by local bus 22 and is shown here as a dotted line to minimize confusion later in the discussion) to shift DATA A from channel 22 in Frame A of the TDM signal stream to channel 1 from port 1, in the next frame period (i.e., Frame B time), and similarly DATA B in Frame B and each successive TDM signal frame period. Also, in this example, host 30 instructs TDM switch 16 to shift DATA C from channel 1 in Frame A of the TDM signal stream to channel 0 from port 2, in the next frame period, and similarly DATA D in Frame B and each successive TDM signal frame period. This direction of data from specific channels in the TDM signal stream to a particular terminating device 20, 28 or 28' is done so that the termination function needed by that data is performed (e.g., devices 28 and 28' might be modems while device 20 might simply be a serial to parallel interface). Note that a TDM switch is a device with serial signals interfacing with all ports. Thus, since in this example there are only three terminating devices, the interconnection of those devices with TDM switch 16 is shown to be a single line (e.g., /1 on line) since the signals are serial, while the other connection of those devices is to local bus 22 which is shown here as a 32 bit parallel bus (e.g., /32 on line) since the data transfer is done in parallel. Once each device has performed the termination function that it was provided to perform, each of those interfacing with local bus 22 do so in a 32 bit wide signal sample (e.g., sometimes referred to as a 32 bit word).

In the reverse direction, the outgoing upstream signals originate from host computer 30 in 32 bit parallel samples that are placed on local bus 22. The data samples that are identified to be encoded by a modem is directed to devices 28 or 28', and the samples data that are not to be encoded or modulated are directed to device 20 which might be a T1/E1 interface unit. In the outgoing upstream direction, T1/E1 interface 20 performs the reverse operation to that described above for incoming downstream signals, namely reserializing the parallel data stream, and presenting that signal to port 1 of TDM switch 16. Modems 28 and 28' similarly reserialize the data, add the modem modulation to the signal and output the signal to port 2 of TDM switch 16. TDM switch 16, in turn, takes the serialized signals from devices 20, 28 and 28', switches them to the expected channels for transmission on TDM bus 12, and interlaces those signals in the 24 channel TDM format which is applied to TDX bus 12 from port 0 for transmission to commercial telephone system 10 for distribution as per the included telephone routing information in the data. This system is of necessity hardware intensive by the inclusion of dedicated hardware for each function; whereas the approach of the various embodiments of the present invention more readily lend themselves to software implementation and thus require less hardware to perform the same functions.

Before discussing the details of the various embodiments of the present invention, a few words as to structure of the various signals that are present on TDM bus 12 and local bus 22 are presented here. In FIG. 3b there is shown a simplified diagram of the signals that are being carried by TDM bus 12. A TDM data stream is a serial data stream which includes a serial data stream of 8 bits of data for each of the 24 channels as described above with respect to FIG. 1, a synchronization signal that acts as a frame marker or start pulse, and a continuously running clock signal (e.g., very stable 8 Khz for telephone systems). Since each the data bits are defined by the occurrence of a fixed number of clock pulses, the time of occurrence of each data bit is determined by devices working off of the TDM stream by, beginning with the synchronization pulse, counting the number of clock pulses occurring in each channel period, thus enabling the separation of the data of each channel.

Next in FIG. 3c there is a graphical representation of the 8 bits of data in each channel of a TDM frame. Since the timing of each channel, and each bit of data within the channel, is tied to the clock pulse in the TDM stream, no additional information need be included in each channel in a TDM data stream to determine the actual position of each bit of data within the serial TDM data stream.

Figure 3E:
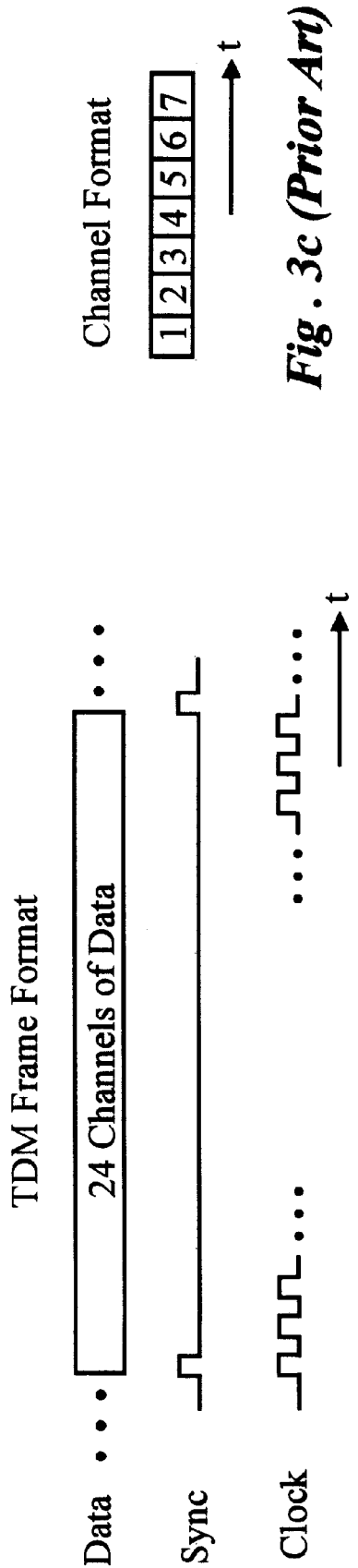
FIG. 3e is a simplified signal diagram of data on an address/bit local bus.
Figure 3E:
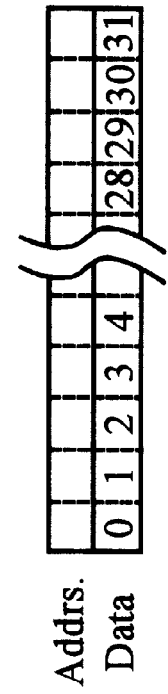

Local bus 22, however, is a parallel data bus and due to the non-deterministic nature of the local bus, the data on local bus 22 carries a destination address of the hardware on the bus that is the intended destination. There are two types of local buses currently in use. There is the shared address bus in which there is a single address associated with all of the data in the sample as illustrated in FIG. 3d. Alternatively, there are the local buses that include an address with each bit or sample of data as illustrated in FIG. 3e.

Typically, in a shared non-deterministic bus structure, like local bus 22, initially host computer 30 assigns an address and function to each component connected to the local bus. This would include information as to which channel in the TDM data stream that component is to interact with to either terminate the data or to re-route it to a second device on the local bus. Where multiple devices are required to terminate data from the TDM bus, linked addresses will be provided to the various devices to provide the progressive addresses necessary to direct the data through the various necessary functions and then onto the host. A similar address/function assignment is provided for each device in the up-stream direction as well.

Figure 4:
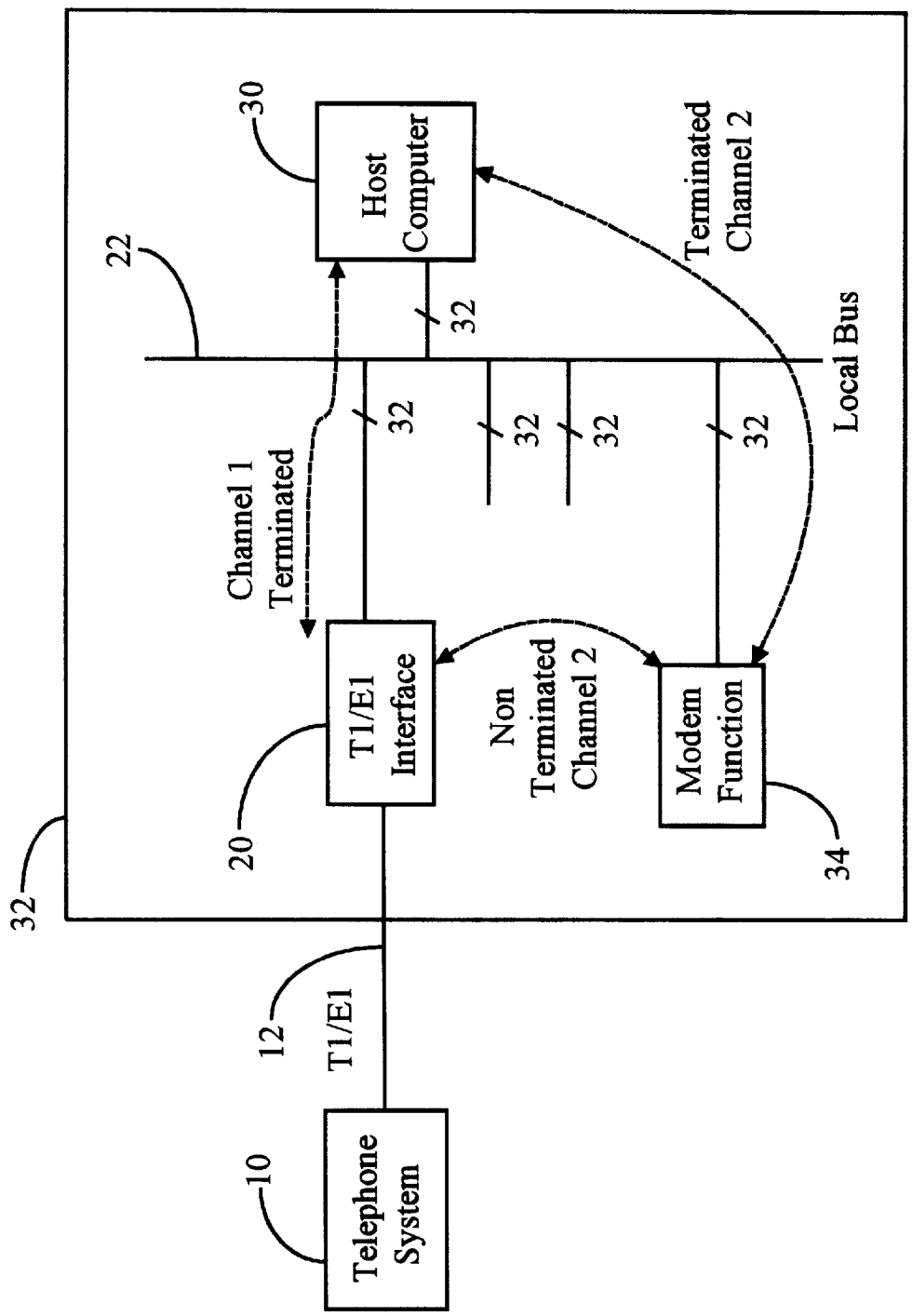
FIG. 4 is a generalized schematic representation of the present invention.

Next, in FIG. 4, a generalized form of the present invention is illustrated in a block diagram. In each of the embodiments of the present invention, the serial to parallel conversion of the signals from TDM bus 12 is performed earlier than in the prior art to simplify the hardware needed to terminate the signals from the various channels of the TDM data stream. Again, for simplicity of discussion, the downstream operation will be discussed first. In these embodiments a T1/E1 interface 20 receives the 24 channel TDM data stream from the commercial telephone system 10 via TDM bus 12. The data in those channels that are not specifically encoded (e.g., modem modulated) are terminated by the T1/E1 interface 20, converted serial to parallel and formatted into separate 32 bit wide samples which are placed on local bus 22 from which host computer 30 has access to that data. This is illustrated in FIG. 4 with the broken line labeled "Channel 1 Terminated". Data from various channels of the TDM data stream on TDM bus 12 that is encoded is not terminated by T1/E1 interface 20. Instead that data is converted, serial to parallel, and formatted into separate 32 bit wide samples by T1/E1 interface 20 and placed on local bus 22 for a device such as modem function 34 to receive that data for termination. This is illustrated in FIG. 4 with the broken line labelled "Non Terminated Channel 2". Modem function 34 then accepts the encoded data samples from local bus 22 corresponding to the channel of the TDM data stream that is directed to it, and then terminates that data and places unencoded data samples for that channel on local bus 22 for use by host computer 30. This is illustrated in FIG. 4 with the broken line labelled "Terminated Channel 2".

In the upstream direction host computer 30 generates a digital signal in 32 bit wide samples that contain an address and channel designation for that information. That address includes identification of the device that is needed to process that data (e.g., modem function 34) to encode it, or simply the address of T1/E1 interface 20 when no encoding is necessary. If encoding is necessary, modem function 34 adds the necessary encoding to the data samples and places the encoded 32 bit samples on local bus 22. All encoded data and data not requiring encoding is then on local bus 22 available for T1/E1 interface 20 to obtain those data samples, parallel to serial convert them, format them into the multi-channel TDM signal format and to place them on TDM bus 12. As stated above when discussing the operation of the prior art, these interfaces with TDM bus 12 have the same constraints as in the prior art systems: there must be a hand-off of upstream data in return for downstream data; they must be formatted in the 24 channel format for the TDM bus; and the clock must be adhered to with the same precision.

The various embodiments of the present invention discussed individually below, are each designed to provide a modem function 34 to the system of FIG. 4, and, in so doing, make the non-deterministic local bus 22 pseudo deterministic. This is possible since the actual data rate of the information received from the TDM channels is provided at a highly accurate clock rate so it can be assumed that in digital form the data has the same clock rate, and when that is considered together with the knowledge of how many modules are interfaced to the local bus 22 of host computer 30, the worst case latencies can be predicted. Thus, in the short term (e.g., over a period of seconds) the local bus 22 is non-deterministic, however, in the long term (e.g., over a period of minutes) local bus 22 is much more deterministic in actual data transfer even though the local bus retains its non-deterministic lack of control.

Figure 5:
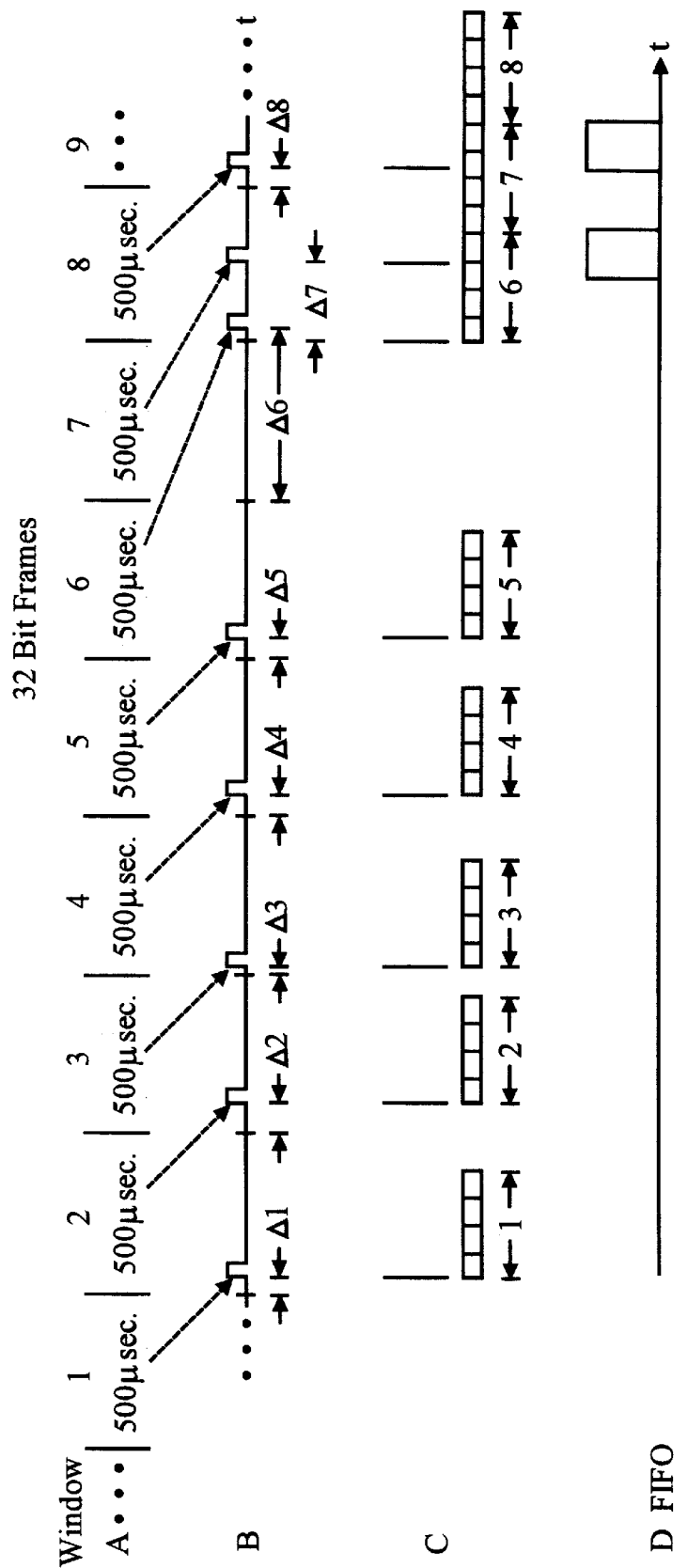
FIG. 5 is timing diagram to illustrate the capturing of data from the non-deterministic local bus by the present invention to prevent the loss of data.

Since local bus 22 is non-deterministic and the occurrence of any piece of data thereon is unpredictable and subject to the data load that is being carried, a vehicle is necessary that can handle the non-deterministic nature of local bus 22 in the present invention. FIG. 5 illustrates the nature of signal transmission on local bus 22. As stated above, the data on local bus 22 is transmitted in 32 bit samples (i.e., four 8 bit TDM bit samples from the same channel) that are transmitted in parallel. Thus, since 8 bits of data for a single channel is transmitted in each 125 $\mu$sec. TDM frame, the data from four TDM frames is needed to generate the necessary 32 bit sample for each channel on local bus 22. Thus, the repeating 500 $\mu$sec. timing marks (4×125 $\mu$sec.) across the top of FIG. 5.

For purposes of this portion of the discussion, assume that the data represented is data from channel 1 in the TDM data stream. Each 32 bit sample of downstream data to be placed on local bus 22 is going to be formed initially by TI/E1 interface 20 from four groups of 8 bits of data received every 125 $\mu$sec., so every 500 $\mu$sec. a 32 bit sample will be generated and placed on local bus 22 which will have a rough access time of 500 $\mu$sec., depending on traffic and due to the non-deterministic nature of local bus 22.

For purposes of this discussion, assume that this transfer to local bus 22 for the data from channel 1 occurs as illustrated on the time line B in FIG. 5 just below the 500 $\mu$sec. timing windows. Here the data of the first sample is placed on local bus 22 from the first time window in the next time window at 500 $\mu$sec. plus a $\Delta 1$, the second sample from the second time window in the third time window at 500 $\mu$sec. plus a $\Delta 2$, a third sample in the fourth time window at 500 $\mu$sec. plus a $\Delta 3$, a fourth sample in the fifth window at 500 $\mu$sec. plus a $\Delta 4$, a fifth sample in the sixth time window at 500 μsec. plus a Δ5, a sixth sample in the eighth window at 500 μsec. plus a Δ6, a seventh sample also in the eighth time window at 500 μsec. plus a Δ7, and an eighth sample in the ninth window at 500 μsec. plus a Δ8. The delay of placement of the sixth sample on local bus 22 until the eighth window in this example results from local bus 22 not being available because of traffic thereon from other devices and host computer 30. Thus over the short term the data transfer rate on local bus 22 is not very accurate, however, because the transfer rate on TDM bus 12 is very accurate, over a longer period the transfer rate variations will cancel each other out and the long term transfer rate will be very accurate which can be seen from the following formula:

(500−Δ1+Δ2)+(500−Δ2+Δ3)+(500−Δ3+Δ4) . . .+(500−Δ{N−1}+ ΔN)/N−1=500 where N−1 is the average rate.

Thus, in the example of FIG. 5, the double availability of data in window 8 requires that modem function 34 of FIG. 4 include an elastic store (e.g., variable length FIFO {First-In-First-Out}) to capture the data from local bus 22 and to hold the data until it can be processed, thus preventing the loss of data. Then on line C of FIG. 5 each of the data samples from the windows at the top of FIG. 5 are processed in modem function 34 following the corresponding delay Δx and is shown as four 8 bit bytes that each represent the 8 bits that were contributed from each of the four consecutive TDM signal frames to make up the 32 bit sample on local bus 22 for channel 1. From line C it can be seen that there is not sufficient time to process sample 6 before sample 7 must be retrieved from local bus 22, and similarly sample 8 which becomes available before the processing of sample 7 is completed by modem function 34. Then on line D of FIG. 5 there is an illustration of the elastic extension of the FIFO during windows 8 and 9 that is needed to prevent the loss of data represented by samples 7 and 8 as samples 6 and 7, respectively, are being processed.

Since frequency rate information that is inherent in a TDM signal is removed when that signal is converted into the 32 bit wide parallel sample, the key the makes each of the embodiments of the present invention possible is the fact that the TDM signals occur at a highly stable rate (e.g., in telephone applications transmissions occur at an 8 KHz rate generated with a Stratum 4 clock that is extremely stable having a tolerance that is extremely tight, typically less than 35 PPM—parts per million). That being the case, modem function 34 and host computer 30 expect the 32 bit parallel samples on local bus 22 to be extremely stable and to be at the rate provided by the commercial telephone system despite the fact that local bus 22 is a non-deterministic bus (i.e., signals are added to, and removed from, local bus 22 freely by each of the components connected to it with little, or no, coordination by host computer 30).

Figure 6:
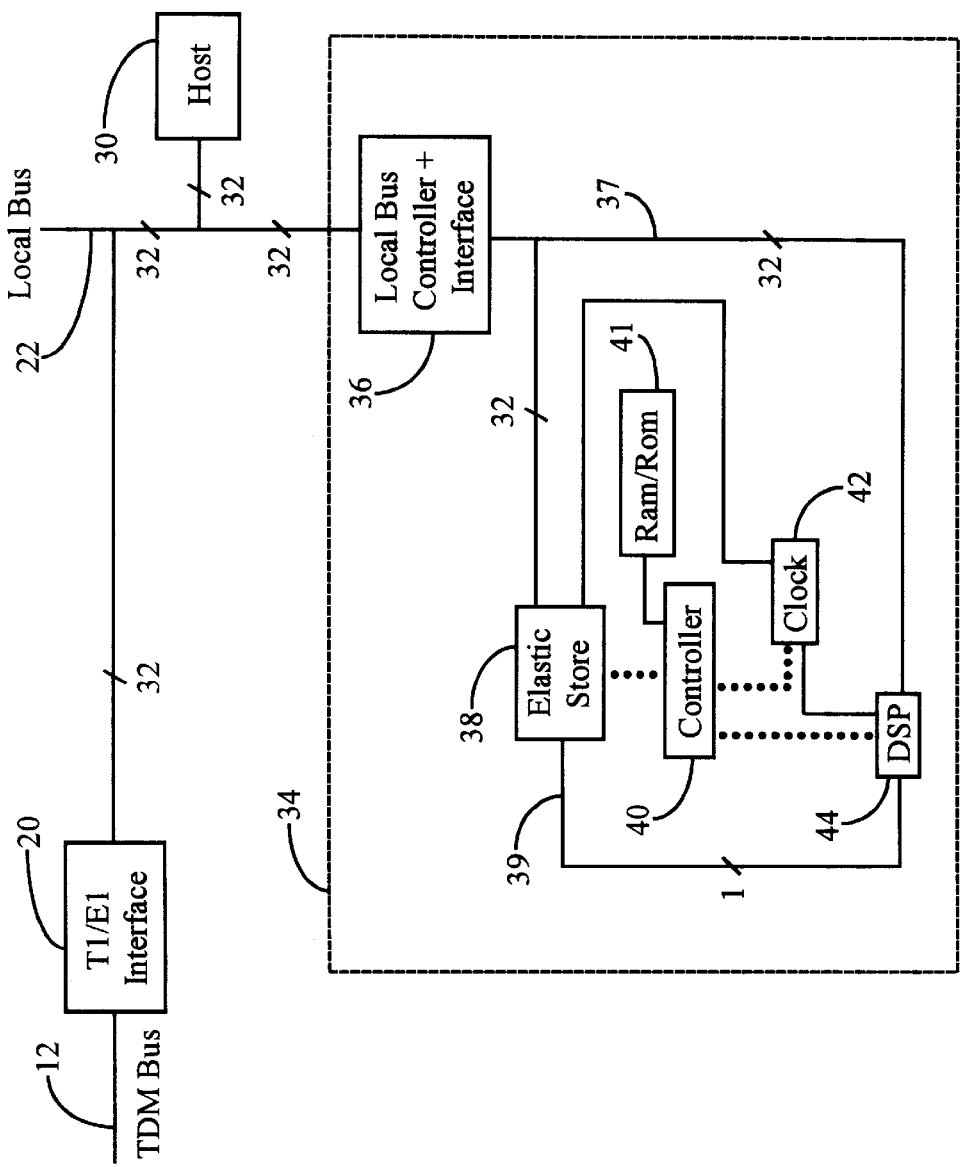
FIG. 6 is a schematic representation of a first embodiment of the present invention.

FIG. 6 illustrates a first specific embodiment of modem function 34 of FIG. 4. In an overview of this embodiment, signals created from various channels on TDM bus 12 that can not be terminated by T1/E1 interface 20 are converted serial to parallel, and placed on local bus 22 by T1/E1 interface 20 in the 32 bit sample required by local bus 22. Included in that non-terminated data sample placed on local bus 22, is an address to a terminating device, say modem function 34, to perform the necessary termination of the data before host computer 30 can utilize that data.

More specifically, the modem function 34 of FIG. 6 includes local bus controller and interface 36 that is connected to local bus 22 to receive and hand-off data, and to control the timing of those functions. Internal to modem function 34, local bus controller and interface 36 interfaces with a parallel internal data bus 37 to hand-off received data to elastic store 38 and to receive decoded data from DSP (digital signal processor) 44. From elastic store 38, under the control of a controller 40 and RAM/ROM 41, data is read-out onto a synthesized serial TDM bus 39 for delivery to DSP 44 also under control of controller 40 at a clock rate established by clock 42.

Additionally, local bus controller and interface 36 decodes the address of data sample on local bus 22, accepts the data having the address that device 34 was programmed to accept (during system definition as discussed above), converts the signal format if internal data bus 37 has a different parallel structure than local bus 22, and re-addresses data leaving device 34 based in the address linking instructions pre-programmed thereinto (during system definition).

Since local bus 22 is non-deterministic, as a result, modem function 34 in the short term at times will not receive data as soon as it is received from TDM bus 12 by T1/E1 interface 20 (as illustrated in FIG. 5), so the frequency for clock 42 is selected to be slightly faster than the actual clock rate of the TDM data on bus 12 (e.g., 8.2 KHz as opposed to 8 KHz). However, since clock 42 is running at a rate that is faster than the actual TDM data rate, and the TDM data rate is a known, very stable rate, it is not necessary that the tolerance of the frequency rate of clock 42 be as accurate as the data rate on TDM bus 12. Also since the local bus is non-deterministic, an elastic store is used instead of a fixed length FIFO memory since the number of data samples received from local bus 22 at any one time can vary.

In operation, as data is received, elastic store 38 serially transfers those data samples to synthesized TDM bus 39 at the rate of clock 42. Then, despite the fact that this data is running at a clock rate that is faster than the data rate of TDM bus 12, DSP 44 assumes that the data received from synthesized TDM bus 39 was created at the highly accurate data rate of the TDM bus 12 when processing that data. Thus, DSP 44 processes the data as it is received by decoding that data and passing it on to data bus 37 to be transferred to local bus 22 by local bus controller and interface 36.

Referring also to line C of FIG. 5, after processing the available data from elastic store 38, controller 40 disables clock 42 resulting in DSP 44 pausing to await the next block of data to be received by elastic store 38, and thus the process is repeated to disposed of the newly received data. Specifically with respect to the example of line C of FIG. 5, clock 42 is enabled to cause DSP 44 to process the first sample of data in window 2 and to then be disabled when that data is processed still within window 2. For the situation for samples 6, 7 and 8 where the clock remains operational until all three data samples are processed from elastic store 38 before the clock signal is again disabled. This is possible since DSP 44 can be selected to process 32 bits of data faster than that data is presented from TDM bus 12, coupled with the fact that a DSP does not require a continuous clock signal to remain synchronized. This is possible since controller 40 monitors the receipt of additional data samples by elastic store 38, thus always knowing how much data is present for processing. Additionally, controller 40 knows that data is provided in samples with a fixed number of bits (e.g., 32 bits in the example discussed above), as well as knowing the bit rate of the TDM bus to which local bus 22 is indirectly coupled.

In the upstream direction the incoming signals to modem function 34 originate from host computer 30, are placed in elastic store 38, feed to DSP 44 via synthesized TDM bus 39, and DSP 44 with software running on controller 40 encodes the data (e.g., modulates the data) for transmission via TDM bus 12, places the encoded data on data bus 37 where it is transferred to local bus 22 via local bus controller and interface 36 with an address to T1/E1 interface 20. From local bus 22, T1/E1 interface 20 receives the data samples, performs a parallel to serial conversion and multiplexes the data, together with other data, in corresponding channels in the format of the TDM data stream and hands off the serial TDM data stream to TDM bus 12.

To function, elastic store 38 must be long enough to handle the worst case burst situation on local bus 22. Similarly, host computer 30 and T1/E1 interface 20 must also have an elastic store since local bus 22 may not be able to take a hand-off of a data sample at the moment in time that each of them has the data to hand-off. T1/E1 interface 20, for example is receiving data at a constant rate from TDM bus 12, and must be handing off upstream data at the same constant rate. The rate of data transfer to and from TDM bus 12 can not be stopped, or even slowed down. Thus, the length of elastic store 38 must be on the order of the length of the elastic store in T1/E1 interface 20. Typically, in most applications that will require elastic store 38 to be able to hold up to 8 samples of data to handle any potential heavy burst situation on local bus 22.

In operation, the embodiment of FIG. 6 then must be able to process 8 bits of data in less than 125 $\mu$sec. for telephone applications. This is so since each 125 $\mu$sec. frame on TDM bus 12, 8 bits of data is provided for each channel. While those 8 bits occur in approximately 5.2 $\mu$sec. (125 $\mu$sec. divided by 24 channels), the next 8 bits of data for the same channel does not occur for 125 $\mu$sec. So, if there was no possibility of data bursts on local bus 22, DSP 44 would have to be able to process 8 bits of data in 125 $\mu$sec. However, since local bus 22 is subject to data bursts by virtue of the non-deterministic nature of the local bus, DSP 44 must be able to process 8 bits of data in less than 125 $\mu$sec. for DSP 44 to be able to catch-up from worst case burst situations to prevent the loss of data. In order to do so, the software that controls DSP 44 must, for example, be able to process 8 bits of data in less than 100 $\mu$sec. for telephone applications, and the code path time experienced could potentially be as short as 80 $\mu$sec. to process 8 bits of data.

Thus, if DSP 44 is simulating the function of a modem, the code path that controller 40 provides DSP 44 will modulate and demodulate the data and add/delete other modem overhead data to/from each 8 bits of data.

Figure 7:
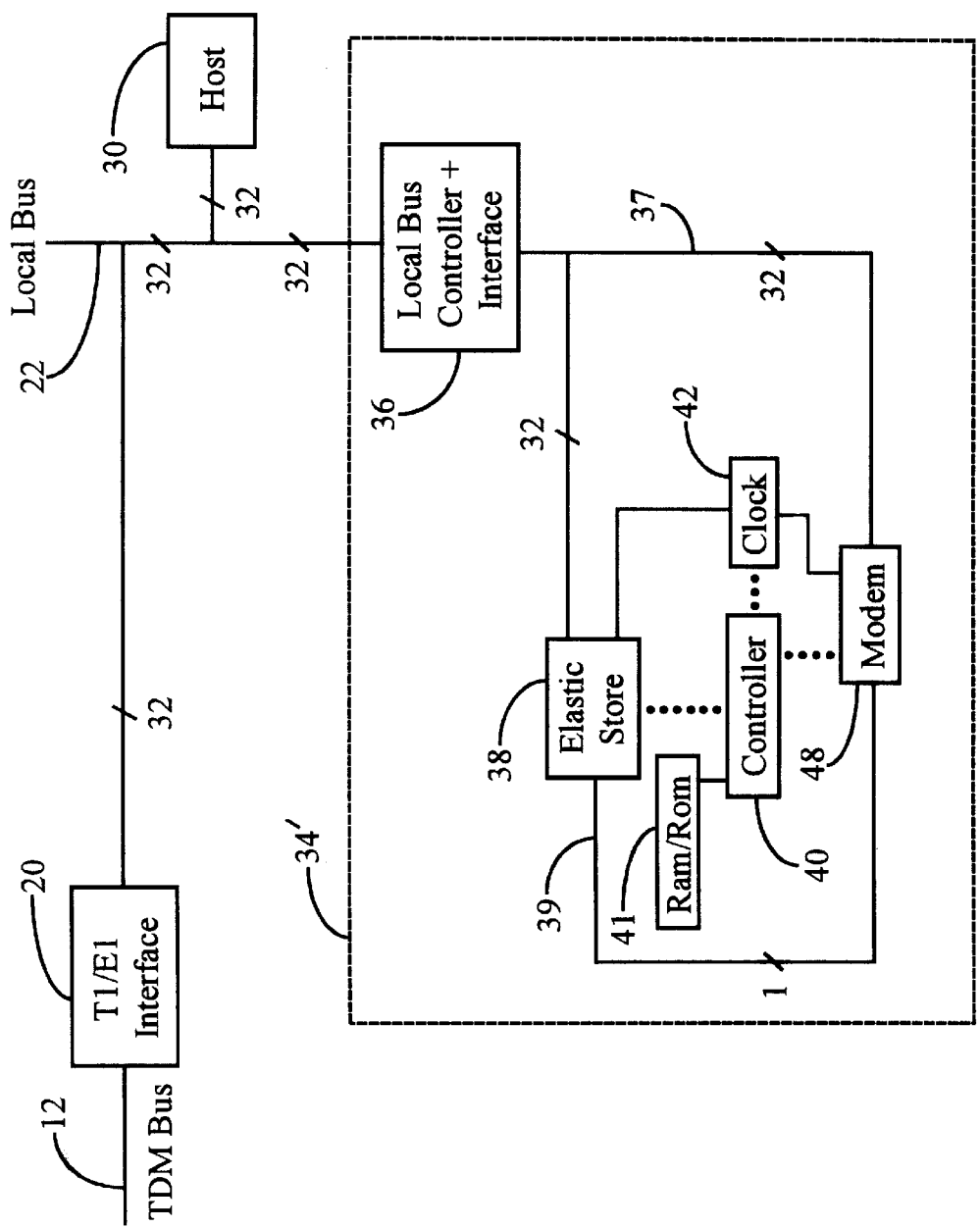
FIG. 7 is a schematic representation of a second embodiment of the present invention.

FIG. 7 illustrates the second embodiment of the present invention which is substantially the same as that shown in FIG. 6 with DSP 44 being replaced by modem 48. Where the key to operation in the first embodiment was to process the data through DSP 44 faster than the data rate on TDM bus 12 and to stop the clock when the processing was caught-up, modem 48 in FIG. 7 expects a constant clock signal. Thus, since the clock rate in the telephone example that has been carried throughout the discussion herein is 125 $\mu$sec., the rate from clock 42 must be 2.048 ±δ MHz which corresponds to the TDM frame rate of 125 $\mu$sec., however, as will be seen below, that clock rate does not have to have the precision that is used on TDM bus 12. In this embodiment, to be able to deal with the data bursts that occur on local bus 22 from time to time a different mechanism must be used than in the first embodiment since a continuous clock signal is necessary for modem 48.

Here the burst is dealt with by varying the clock rate within some tolerance (e.g., ± 0.2%, or perhaps ± 0.4%). This is possible since modem 48 can be operated slightly faster or slower without losing synchronization. Thus, controller 40 is programmed to phase lock clock 42 to the 32 bit data samples as they are received by elastic store 38 since those 32 bits occur on TDM bus 12 in four frames, i.e., within 500 $\mu$sec. This phase locking is performed by shifting the phase of clock 42 to accommodate the rate that data is received by elastic store 38 from local bus 22.

That is accomplished with what can be described as a 'byte-sync' circuit in the form of a DPLL (digital-phaselock-loop) that is 'locked' to the arriving samples of TDM data via local bus 22. As stated above, since the local bus 22 is non-deterministic, those samples of data arrive at uneven boundaries resulting in the DPLL seeing what would normally be described as a 'noisy' signal. Together with a local oscillator that is the master frequency generator for clock 42 and the local bus data writes, the DPLL regenerates a clock signal that is nearly exactly the same as that of the TDM data on TDM bus 12 with the recreated TDM signal on synthesized TDM bus 39.

In actual operation, then, if the rate at which elastic store 38 receives data is slow, clock 42 is phase shifted to make one or more clock pulses long (i.e., reduces the clock rate). However, if there is a burst of data that is received by elastic store 38, controller 40 will update the phase lock of clock 42 sooner, and in so doing will again phase shift the clock signal to shorten one or more clock pulses which in effect increases the clock rate. Of course in actual operation these clock phase shifts are performed slowly and within the operational range of modem 48 to prevent the loss of synchronization or data.

Then in the upstream direction this embodiment takes the data from local bus 22 into elastic store 38, phase locks clock 42 to the rate the data is received, modulates the data with modem 48 and places that modulated data on local bus 22 via internal bus 37 and local bus controller and interface 36.

Before addressing the third embodiment of the present invention, attention is again directed to FIG. 6. A standard DSP has two interfaces: a parallel interface to the right (i.e., the one connected to internal bus 37), and a serial TDM interface to the left (i.e., the one that is connected to serial synthesized TDM bus 39). Although the code to drive a DSP today is written to accept non-terminated data at the TDM interface and hand terminated data off at the parallel interface, a DSP will operate using only the parallel interface as a bi-directional interface for both functions, if so programmed.

Figure 8:
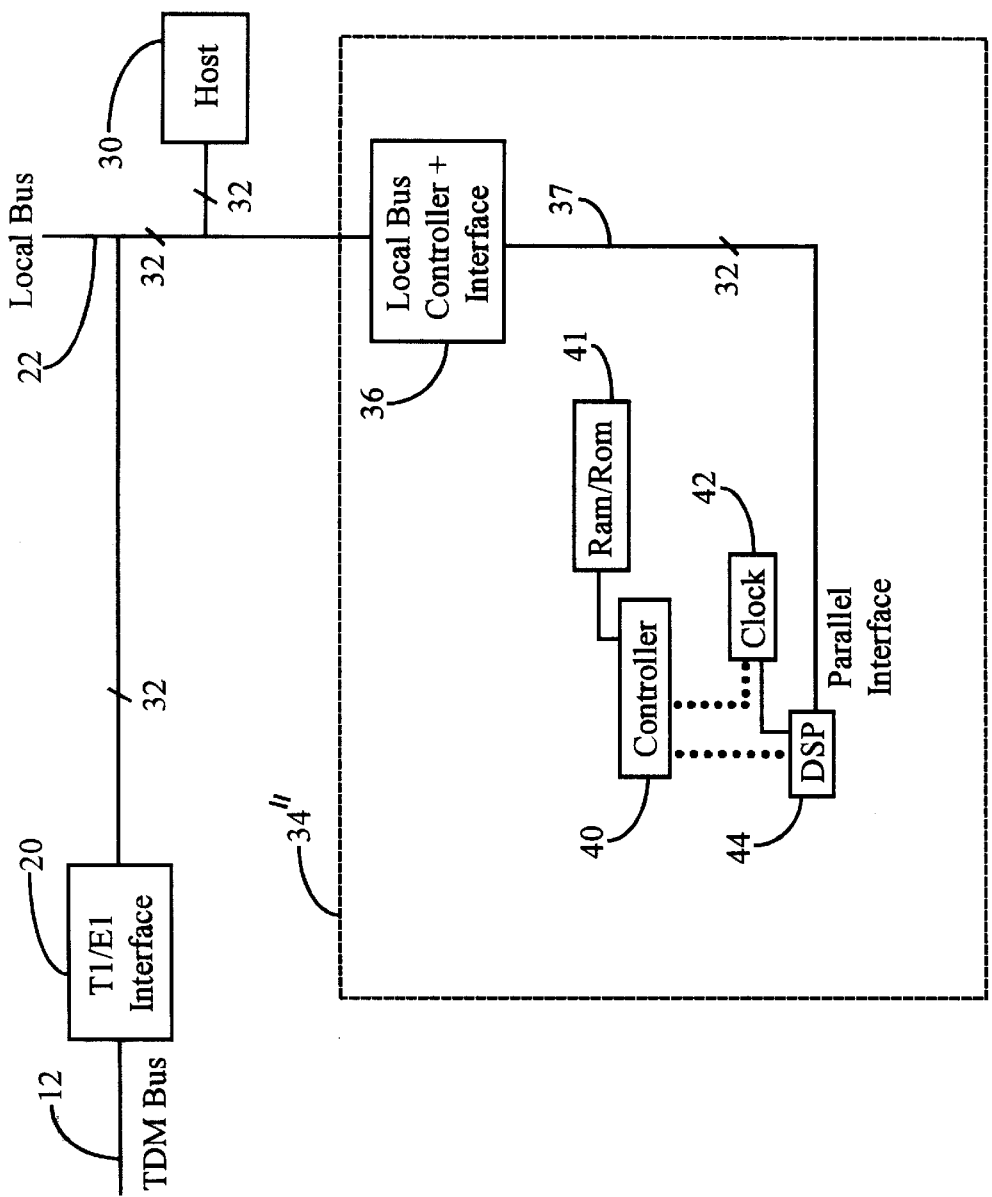
FIG. 8 is a schematic representation of a third embodiment of the present invention.

FIG. 8 illustrates a simplified block diagram for the third embodiment of the present invention which resembles that of FIG. 6 with elastic store 38 removed and only the parallel interface of DSP 44 being utilized. In this configuration non-terminated data from local bus 22 is provided to DSP 44 via internal bus 37 at the parallel interface, and then the terminated data is delivered to internal bus 37 also from the parallel interface for delivery to local bus 22. The code operating on controller 40 in this embodiment would cause DSP 44 to operate as if there was an embedded FIFO in DSP 44, and turn clock 42 on and off as described above with respect to FIG. 6 to accommodate normal, delayed or burst data on local bus 22. In addition, controller 40 also causes DSP 44 to terminate the data in the same way as in the first embodiment discussed in relation to FIGS. 5 and 6.

While in the above discussion the examples used for the TDM signal path was the public telephone network, there are other applications where TDM signals are utilized and each of the present inventions are applicable to those applications as well as to telephone systems. Similarly, there are many types of local buses with which the present invention is compatible, some of them are PCI, ISA and EISA, however this is not an exhaustive list and the present invention is not to be considered limited to any one of them, or only them.

Although the descriptions above primarily discuss the use of present generation implementation techniques, some specific technologies involved in the preferred embodiments of the present invention are expected to change as time evolves. As will be understood by those familiar with the art, the present invention may be embodied in other specific forms without departing from the spirit or essential characteristics thereof. Further, even though each of the embodiments of the present invention are discussed above in the simplified form of processing the data to and from a single TDM channel, the extension of each of those embodiments to multiple TDM channels will be obvious to one skilled in the art. Thus, the scope of the present invention, in its full interpretation, is only to be limited by the scope of the claims appended hereto.

What is claimed is:

1. A method for utilizing a non-deterministic, shared local bus to transport data signals between channels of a TDM signal stream on a TDM bus and a host computer coupled to said local bus absent clock signals from said TDM bus, with an interface unit coupled between said TDM bus and said local bus and a device-for encoding/decoding data signals coupled to said local bus, wherein said TDM signal stream includes a clock signal having a highly accurate fixed frequency clock rate that is available to said interface unit, said method comprising the steps of:

a. converting said data from a serial, multi-channel TDM data format of said TEM signal stream to a parallel data sample for use on said local bus absent said dock signals from said TDM bus with all data in each particular parallel data sample corresponding to data from a same channel of said TDM data format with said interface unit;

b. directing parallel data samples converted from said TDM signal stream in step a. via said local bus to said encoding/decoding device or to said host computer, wherein unencoded data samples are directed to said host computer and encoded data samples are directed to said encoding/decoding device;

c. unencoding said encoded data samples from step b. with said encoding/decoding device;

d. redirecting unencoded data samples of step c. to said host computer via said local bus;

e. directing parallel data samples that are not to be encoded from said host computer via said local bus to said interface unit;

f. directing parallel data samples that are to be encoded from said host computer via said local bus to said encoding/decoding device;

g. encoding unencoded data samples from said host computer with said encoding/decoding device;

h. redirecting encoded data samples of step g. to said interface unit via said local bus;

i. converting said data samples from steps f. and h. into multi-channel TDM data format by means of said interface unit with all data in each particular parallel data sample in a same channel of said TDM data format and said clock signal of said TDM signal stream added.

2. The method as in claim 1 wherein steps c. and g. comprise the steps of:

j. temporarily storing said parallel data samples directed to said encoding/decoding device;

k. clocking said data samples stored in step j. out in a serial data stream at a clock rate that is at least as fast as said known clock rate of said TDM signal using a clock signal that is independent of said TDM clock signal;

l. decoding said serial data stream from step k. for data originating from said TDM signal and encoding said serial data stream from step k. for data originating from said host computer; and m. converting said serial data stream from step l. to parallel data samples.

3. The method of claim 2 wherein said serial data stream from step k. is a synthesized TDM data stream.

4. The method of claim 2 wherein step l. demodulates said serial data stream for data originating from said TDM signal and modulates said serial data stream for data originating from said host computer.

5. The method of claim 2 wherein:

step k. includes the steps of:

n. idling said independent clock signal of step k. when only a minimal amount of data samples have been temporarily stored; and o. clocking temporarily stored data samples at a clock rate that is faster than said known clock rate-of said TDM signal using said clock signal that is independent of said TDM clock signal when there is more than said minimal amount of data temporarily stored; and step l. includes the step of:

p. applying a clock signal at the same clock rate as in step o. to said encoding/decoding device.

6. The method of claim 2 wherein:

step k. includes the step of:

n. phase locking said clock rate of step k. to a rate at which said parallel data samples are temporarily stored by step j. by advancing said clock rate as said rate of sample storage increases and retarding said clock rate as said rate of sample storage decreases; and step l. includes the step of:

o. applying a clock signal at the same clock rate as in step n. to said encoding/decoding device.

7. A bi-directional interface and termination system between a serial TDM data bus and a host computer using a non-deterministic local bus absent dock signals from said TDM bus, with a TDM signal stream on said TDM bus formatted serially with a fixed number of channels per frame and a fixed number of bits per channel for each frame and data on said local bus is formatted in a parallel data sample that is a fixed number of bits wide with an associated destination address with each sample absent clock signals from said TDM bus, and each parallel data sample contains data corresponding to a specific one of said channels of said TDM data, wherein said TDM signal stream includes a clock signal having a highly accurate fixed frequency clock rate, said interface and termination system comprises:

a TDM line interface unit having a serial port coupled to said TDM bus and a parallel port coupled to said local bus to bi-directionally convert said data between said serial, multi channel TDM data format and said parallel data sample format, and to direct downstream parallel data samples absent clock signals from said TDM bus to a specific device or said host computer each coupled to said local bus, wherein unencoded data samples are directed to said host computer and to add said clock signal of said TDM signal stream upstream signals; and an encoding/decoding module coupled to said local bus to receive upstream and downstream directed parallel data samples, wherein said downstream parallel data samples have been directed to said encoding/decoding module by said TDM line interface unit and correspond to encoded data received from said TDM bus that are decoded and redirected to said host computer via said local bus, and unencoded upstream parallel data samples that have been directed to said encoding/decoding module by said host computer via said local bus that are encoded and redirected to said TDM line interface unit via said local bus to be included in an upstream TDM signal stream.

8. The bidirectional interface and termination system of claim 7 wherein said TDM line interface unit is a telephone line interface unit and said TDM data bus is part of a public telephone system.

9. The bi-directional interface and termination system of claim 7 wherein said encoding/decoding module decodes parallel data samples directed thereto from said TDM line interface unit, and encodes parallel data samples directed thereto from said host computer.

10. The bi-directional interface and termination system of claim 7 wherein said encoding/decoding module comprises:

a local bus controller coupled to said local bus to receive parallel data samples directed to said encoding/decoding module therefrom and to hand off parallel data samples from said encoding/decoding module thereto;

an elastic store having a parallel port and a serial port with said parallel port coupled to said local bus controller to receive and store parallel data samples therefrom as received;

a DSP having a serial port and a parallel port with said serial port coupled to said serial port of said elastic store and said parallel port coupled to said local bus controller, wherein said DSP encodes or decodes a serial data sample received from said elastic store;

a local clock to generate a clock signal that is independent of said TDM clock signal coupled to said elastic store and said DSP with said local clock having a clock rate that is faster than said known clock rate of said TDM signal stream; and a controller coupled to said elastic store, said DSP and said local clock to control the operation of said elastic store, DSP and local clock.

11. The bi-directional interface and termination system of claim 10 wherein data transferred from said elastic store to said DSP is a synthesized TDM data stream.

12. The bi-directional interface and termination system of claim 10 wherein said controller:

idles said local clock when only a minimal number of data samples have been stored in said elastic store; and enables said local clock when more than said minimal number data samples have been stored in said elastic store.

13. The bidirectional interface and termination system of claim 7 wherein said encoding/decoding module comprises:

a local bus controller coupled to said local bus to receive parallel data samples directed to said encoding/decoding module therefrom and to hand off parallel data samples from said encoding/decoding module thereto;

an elastic store having a parallel port and a serial port with said parallel port coupled to said local bus controller to receive and store parallel data samples therefrom as received;

a modem having a serial port and a parallel port with said serial port coupled to said serial port of said elastic store and said parallel port coupled to said local bus controller, wherein said modem encodes or decodes a serial data sample received from said elastic store;

a local clock to generate a clock signal that is independent of said TDM clock signal coupled to said elastic store and said DSP with said local clock having a clock rate that is faster than said known clock rate of said TDM signal stream; and a controller coupled to said elastic store, said modem and said local clock to control the operation of said elastic store, modem and local clock.

14. The bi-directional interface and termination system of claim 13 wherein data transferred from said elastic store to said DSP is a synthesized TDM data stream.

15. The bi-directional interface and termination system of claim 13 wherein said controller phase locks said clock rate of said local clock related to a rate at which said elastic store receives data samples by advancing said clock rate as said rate of receiving data samples increases and retarding said clock rate as said rate of receiving data samples decreases.

16. The bi-directional interface and termination system of claim 7 wherein said encoding/decoding module comprises:

a local bus controller coupled to said local bus to receive parallel data samples directed to said encoding/decoding module therefrom and to hand off parallel data samples from said encoding/decoding module thereto;

a DSP having a parallel port coupled to said local bus controller, wherein said DSP encodes or decodes a serial data sample received from said local bus controller and to provide a resultant data sample to said local bus controller;

a local clock to generate a clock signal that is independent of said TDM clock signal coupled to said DSP with said local clock having a clock rate that is faster than said known clock rate of said TDM signal stream; and a controller coupled to said DSP and said local clock to control the operation of said DSP and said local clock.

17. The bi-directional interface and termination system of claim 16 wherein:

said DSP receives and stores parallel data samples received by said local bus controller; and said controller:

idles said local clock when only a minimal number of data samples have been stored by said DSP; and enables said local clock when more than said minimal number data samples have been stored by said DSP.

* * * * *